(12) United States Patent
Pei et al.

(10) Patent No.: US 11,936,274 B1
(45) Date of Patent: Mar. 19, 2024

(54) ADAPTIVE COOLING ALLOCATION SYSTEM FOR MULTIPLE MOTORS AND JUNCTION MOTOR ASSEMBLY

(71) Applicant: Suzhou Inn-Mag New Energy Ltd., Suzhou (CN)

(72) Inventors: Ruilin Pei, Suzhou (CN); Xiangyan He, Suzhou (CN); Yueshun Yuan, Suzhou (CN); Zhi Wang, Suzhou (CN); Xuejie Zheng, Suzhou (CN); Lubin Zeng, Suzhou (CN)

(73) Assignee: Suzhou Inn-Mag New Energy Ltd., Suzhou (CN)

( * ) Notice: Subject to any disclaimer, the term of this patent is extended or adjusted under 35 U.S.C. 154(b) by 0 days.

(21) Appl. No.: 18/518,509

(22) Filed: Nov. 23, 2023

(30) Foreign Application Priority Data

Dec. 6, 2022 (CN) .......................... 202211555547.9

(51) Int. Cl.
*H02K 5/20* (2006.01)
*H02K 9/00* (2006.01)
(Continued)

(52) U.S. Cl.
CPC .............. *H02K 5/203* (2021.01); *H02K 5/20* (2013.01); *H02K 9/00* (2013.01); *H02K 9/10* (2013.01);
(Continued)

(58) Field of Classification Search
CPC ........ H02K 5/203; H02K 7/116; H02K 7/183; H02K 9/19; H02K 5/20; H02K 9/00; H02K 9/02; H02K 9/04; H02K 9/06; H02K 9/08; H02K 9/10; H02K 9/12; H02K 9/14; H02K 9/16; H02K 9/18; H02K 1/193; H02K 1/197; H02K 9/22; H02K 9/223; H02K 9/225; H02K 9/227; G05D 23/02

(Continued)

(56) References Cited

U.S. PATENT DOCUMENTS

| 6,386,150 | B1* | 5/2002 | Iwaki | ................. G05D 23/1333 123/41.1 |
| 2013/0161547 | A1* | 6/2013 | Matsusaka | ................ F01P 7/14 251/129.15 |
| 2023/0136588 | A1* | 5/2023 | Hsieh | ................. H05K 7/20272 361/689 |

FOREIGN PATENT DOCUMENTS

| CN | 201344283 Y | 11/2009 |
| CN | 210266014 U | 4/2020 |
| CN | 114017860 A | 2/2022 |

* cited by examiner

*Primary Examiner* — Alexander A Singh
(74) *Attorney, Agent, or Firm* — Nitin Kaushik

(57) ABSTRACT

The present invention discloses an adaptive cooling allocation system for multiple motors and a junction motor assembly. The key points of the technical solution comprise: a plurality of cooling groups, wherein each cooling group comprises a motor and a regulating valve, a cooling channel is arranged in the motor, a liquid inlet channel and a liquid outlet channel are arranged in the regulating valve, respectively, and an outlet end of the liquid inlet channel communicates with an inlet end of the cooling channel; and a main liquid inlet channel, wherein inlet ends of the plurality of liquid inlet channels communicate with the main liquid inlet channel, respectively; a regulating channel is also arranged in the regulating valve; a valve block is arranged in the regulating channel, and extends into the liquid inlet channel, so that a regulating hole is formed between the valve block and the liquid inlet channel.

8 Claims, 7 Drawing Sheets

(51) Int. Cl.
    *H02K 9/10*           (2006.01)
    *H02K 9/19*           (2006.01)
    *G05D 23/02*          (2006.01)
    *H02K 7/116*          (2006.01)
    *H02K 7/18*            (2006.01)

(52) U.S. Cl.
    CPC ................ *H02K 9/19* (2013.01); *G05D 23/02*
        (2013.01); *H02K 7/116* (2013.01); *H02K 7/183*
                                         (2013.01)

(58) Field of Classification Search
    USPC ........... 310/54, 52, 53, 55, 57, 58, 59, 60 R,
                                                      310/60 A, 64
    See application file for complete search history.

ADAPTIVE COOLING ALLOCATION SYSTEM FOR MULTIPLE MOTORS AND JUNCTION MOTOR ASSEMBLY

CROSS-REFERENCE TO RELATED APPLICATIONS

The application claims priority to Chinese patent application No. 202211555547.9, filed on Dec. 6, 2022, the entire contents of which are incorporated herein by reference.

TECHNICAL FIELD

The present invention relates to the field of motors, in particular to an adaptive cooling allocation system for multiple motors and a junction motor assembly.

BACKGROUND

In the industrial field, high-power motors, especially motors with power levels of megawatts or above, are often used. For such motors, the motors are very high in mass, making them difficult in the aspects of manufacturing, transporting, maintaining, etc. Besides, high-power industrial motors generally adopt air-cooled structures, but after long-term use, dust adheres to the surface of a shunt power generation device, thereby seriously affecting the heat dissipation performance of the motors.

The existing Chinese patent with the publication No. CN112855861A discloses a four-shunt structure for a main wind power gearbox and the main wind power gearbox and wind power generation equipment using same. The four-shunt structure comprises a high-speed stage gear arranged at an output end of an output main shaft of the main gearbox, and four shunt power generator devices meshed with the high-speed stage gear; a connecting flange is arranged outside each shunt power generator, and provides a support point for fixing each shunt power generator so as to fix the entire shunt power generation device onto a main transmission gearbox.

However, the equipment in the above patent still has the following problems: 1. although a cooling method of the shunt power generation device is not specified, it can be reasonably inferred that a general air-cooled structure is adopted, after long-term use, dust adheres to the surface of the shunt power generation device, thereby seriously affecting the heat dissipation performance of the motors; and 2. there is no connection between the various shunt power generators, resulting in insufficient overall stability.

The existing Chinese patent with the authorization announcement No. CN205986480U discloses a multi-input motor combination gearbox, which comprises a gearbox component, a driving motor component and a motor cooling component, wherein the driving motor component comprises a driving motor box, four motor stators mounted in four motor mounting holes inside the driving motor box, respectively, and a motor rotor; the motor cooling component comprises a cooling hole, a cooling water inlet joint, and a cooling water outlet joint; cooling water enters the inner part of the driving motor box through the cooling hole from the cooling water inlet joint to cool the driving motor component, and returns through the cooling water outlet joint to form a cooling cycle.

However, the multi-input motor combination gearbox in the above patent still has the following problems: 1. the driving motor box is high in volume and large in weight, making it difficult in the aspects of manufacturing, transporting, maintaining, etc.; 2. if the cooling water cools the driving motor box, the cooling water cannot allocate heat dissipation capacity based on the working conditions of each motor; for example, if two of the motors are working while the other two are non-working, the non-working motors are also allocated with the same heat dissipation, resulting in waste of heat dissipation capacity.

SUMMARY

In response to the defects existing in the prior art, one of the purposes of the present invention is to provide an adaptive cooling allocation system for multiple motors, which can automatically perform differential cooling allocation based on the working conditions of each motor, and reduce the waste of cooling capacity, thereby improving the overall cooling effect.

In order to realize the above purpose, the present invention provides the following technical solution:

an adaptive cooling allocation system for multiple motors, comprising:

a plurality of cooling groups, wherein each cooling group comprises a motor and a regulating valve, a cooling channel is arranged in the motor, and a liquid inlet channel and a liquid outlet channel are arranged in the regulating valve, respectively; an outlet end of the liquid inlet channel communicates with an inlet end of the cooling channel, and an outlet end of the cooling channel communicates with an inlet end of the liquid outlet channel; and a main liquid inlet channel, wherein inlet ends of the plurality of liquid inlet channels communicate with the main liquid inlet channel, respectively;

a regulating channel is also arranged in the regulating valve; a valve block is arranged in the regulating channel, and extends into the liquid inlet channel, so that a regulating hole is formed between the valve block and the liquid inlet channel;

a temperature control regulating mechanism for controlling movement of the valve block based on temperature of a cooling medium in the liquid outlet channel is also arranged in the regulating channel, thereby performing differential cooling allocation on the plurality of cooling groups.

Further, in an initial state, the regulating hole is in a minimum opening state; after the cooling medium flows, a position of the valve block remains unchanged according to the temperature of the cooling medium in the liquid outlet channel to maintain the minimum opening state of the regulating hole, or the temperature control regulating mechanism controls the movement of the valve block to increase opening of the regulating hole.

Further, the temperature control regulating mechanism comprises a temperature control driving component which can be deformed according to temperature changes and uses driving force generated by deformation to control the movement of the valve block.

Further, the temperature control driving component comprises a temperature control spring, a temperature control airbag, or a temperature control chamber formed in the regulating channel.

Further, the temperature control driving component is the temperature control spring which can be in contact with the cooling medium in the liquid outlet channel; the temperature control spring extends at low temperature and contracts at high temperature; and the temperature control regulating mechanism also comprises a pre-tightening spring, and the pre-tightening spring and the temperature control spring act on two sides of the valve block, respectively.

Further, one end of the temperature control spring is in contact with an inner wall of the liquid outlet channel, and the other end is in contact with the valve block; and one end of the pre-tightening spring is in contact with an inner wall of the liquid inlet channel, and the other end is in contact with the valve block.

Further, the temperature control regulating mechanism comprises a driving block, and a driving rod is arranged between the driving block and the valve block;

the temperature control driving component is a temperature control spring which can be in contact with the cooling medium in the liquid outlet channel; the temperature control spring contracts at low temperature and extends at high temperature; the temperature control spring acts on the driving block, and the driving rod penetrates through the temperature control spring; and the temperature control regulating mechanism also comprises pre-tightening springs of which action force directions are opposite to that of the temperature control spring, and the pre-tightening springs act on the valve block or the driving block.

Further, the temperature control regulating mechanism comprises two pre-tightening springs of which action force directions are opposite, the two pre-tightening springs act on the valve block and the driving block, respectively, or the two pre-tightening springs act on the two sides of the valve block, respectively.

Further, the regulating channel comprises a first channel, a second channel, and a third channel which are in sequential communication. The valve block is arranged in the first channel, the driving block is arranged in the third channel, the driving rod penetrates through the second channel, and an inner diameter of the second channel is smaller than that of the third channel;

the two pre-tightening springs are a first pre-tightening spring and a second pre-tightening spring, respectively, wherein one end of the first pre-tightening spring is in contact with the valve block, and the other end is in contact with an inner wall of the liquid inlet channel; one end of the second pre-tightening spring is in contact with the driving block, and the other end is in contact with an inner wall of the liquid outlet channel; and one end of the temperature control spring is in contact with the driving block, and the other end is in contact with an inner wall of the third channel.

Further, the temperature control regulating mechanism comprises a driving block, and a driving rod is arranged between the driving block and the valve block;

a heat conduction block which can be in contact with the cooling medium in the liquid outlet channel is fixedly arranged in the regulating channel; the driving rod penetrates through the heat conduction block, and a temperature control chamber which expands when heated and contracts when cooled is formed among the driving block, the heat conduction block, and an inner wall of the regulating channel; and the temperature control regulating mechanism comprises two pre-tightening springs of which action force directions are opposite, the two pre-tightening springs act on the valve block and the driving block, respectively, or the two pre-tightening springs act on the two sides of the valve block, respectively.

Further, a plurality of heat conduction rods are arranged on one side of the heat conduction block, or a plurality of heat conduction rods are arranged on the two sides of the heat conduction block, respectively.

Further, a liquid outlet diversion channel is arranged in the regulating valve, and an inlet and an outlet of the liquid outlet diversion channel are located on an inner wall of the liquid outlet channel, respectively; and the cooling medium in the liquid outlet channel passes through the liquid outlet diversion channel and transfers heat to the temperature control driving component in the liquid outlet diversion channel.

Further, the plurality of regulating valves are integrated into a main regulating valve, and the main liquid inlet channel is arranged in the main regulating valve; and a main liquid outlet channel is arranged in the main regulating valve, and an outlet end of the liquid outlet channel communicates with the main liquid outlet channel.

In response to the defects existing in the prior art, another purpose of the present invention is to provide a junction motor assembly which can automatically perform cooling allocation according to the working conditions of each motor, thereby improving cooling effects and improving the overall stability.

In order to realize the above purpose, the present invention provides the following technical solution:

a junction motor assembly, comprising a gearbox, multiple motors connected with the gearbox, respectively, the adaptive cooling allocation system for multiple motors, and a fixing plate connected with the multiple motors at the same time, wherein a fixing rod is connected between adjacent motors; the motor comprises a motor casing, and a fixing ring for connecting the fixing rod or the fixing plate is arranged on an outer side wall of the motor casing.

In summary, the present invention has the following beneficial effects:

1. when the total cooling capacity of the system is fixed, differential allocation is adopted to allocate cooling capacity to the working motors as much as possible, thereby reducing waste of the cooling capacity and improving the overall cooling effect; besides, the allocation of the cooling capacity of the system is automatically regulated according to temperature, without need for additional control, thereby simplifying the structure and control, reducing costs, and prolonging service life;
2. temperature control driving components are adopted, and the advantages of being fewer in parts, simple in structure, convenient in production, stable in control, and long in service life are achieved; besides, control circuits are not needed, and various harsh working conditions can be adapted; and
3. the fixing rods and the fixing plate are adopted, which are beneficial for improving the overall stability of the junction motor.

In the Figures: 1. motor; 11. cooling channel; 111. cooling channel inlet; 112. cooling channel outlet; 12. fixing flange; 13. fixing ring; 21. motor liquid inlet channel; 22. motor liquid outlet channel; 3. regulating valve; 31. valve body; 321. liquid inlet channel; 322. liquid outlet channel; 323. liquid outlet diversion channel; 33. regulating channel; 331. first channel; 332. second channel; 333. third channel; 34. valve block; 341. first pre-tightening spring; 35. temperature control spring; 361. driving block; 362. driving rod; 363. second pre-tightening spring; 37. heat conduction block; 371. heat conduction rod; 38. temperature control chamber; 4. main liquid inlet channel; 5. main liquid outlet channel; 6. main regulating valve; 7. gearbox; 81. fixing rod; 82. fixing plate.

DETAILED DESCRIPTION OF THE EMBODIMENTS

The present invention is further explained in detail in conjunction with the accompanying drawings.

The specific embodiment is only an explanation of the present invention without limitation of the present invention. After reading the description, those skilled in the art can make non-creative modifications to the present embodiment as needed, but as long as it falls within the scope of the claims of the present invention, it is protected under the patent law.

Figure 1:
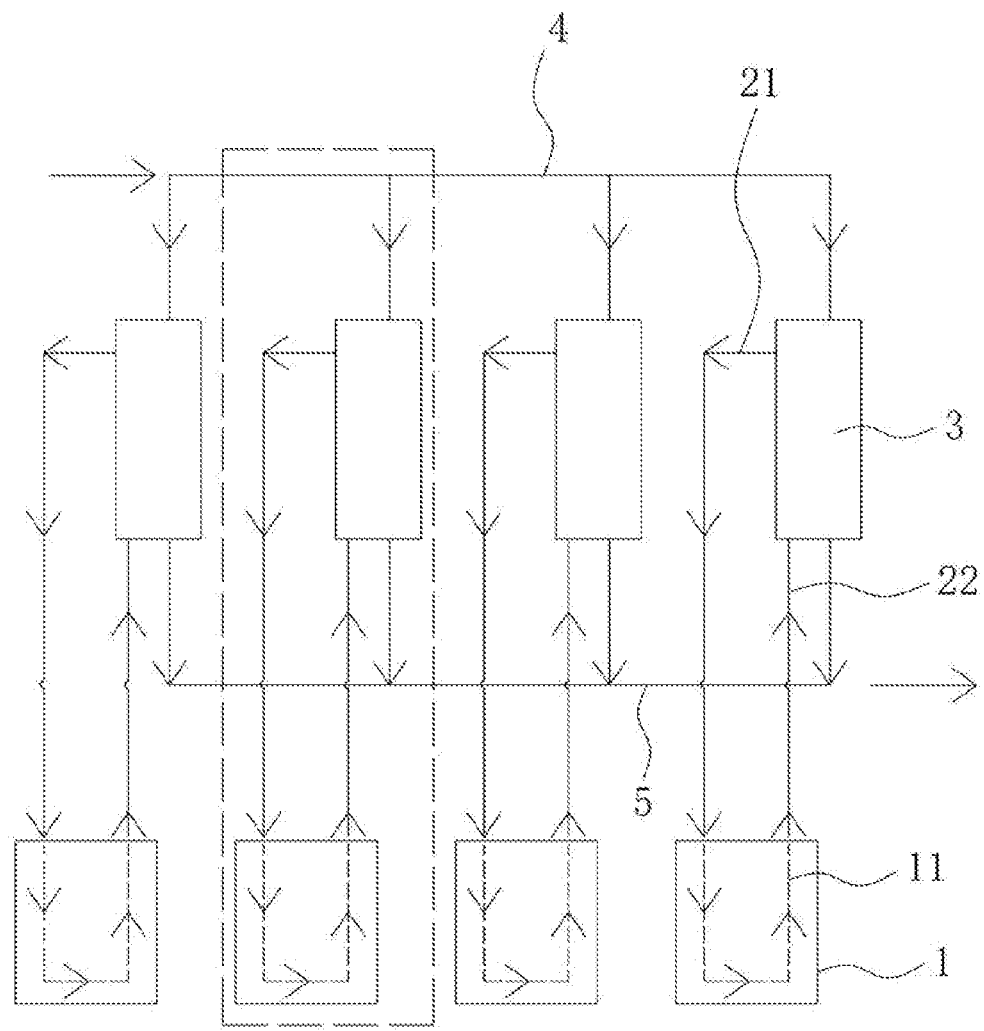
FIG. 1 is a schematic structural diagram of an adaptive cooling allocation system for multiple motors in Embodiment 1.
Figure 2:
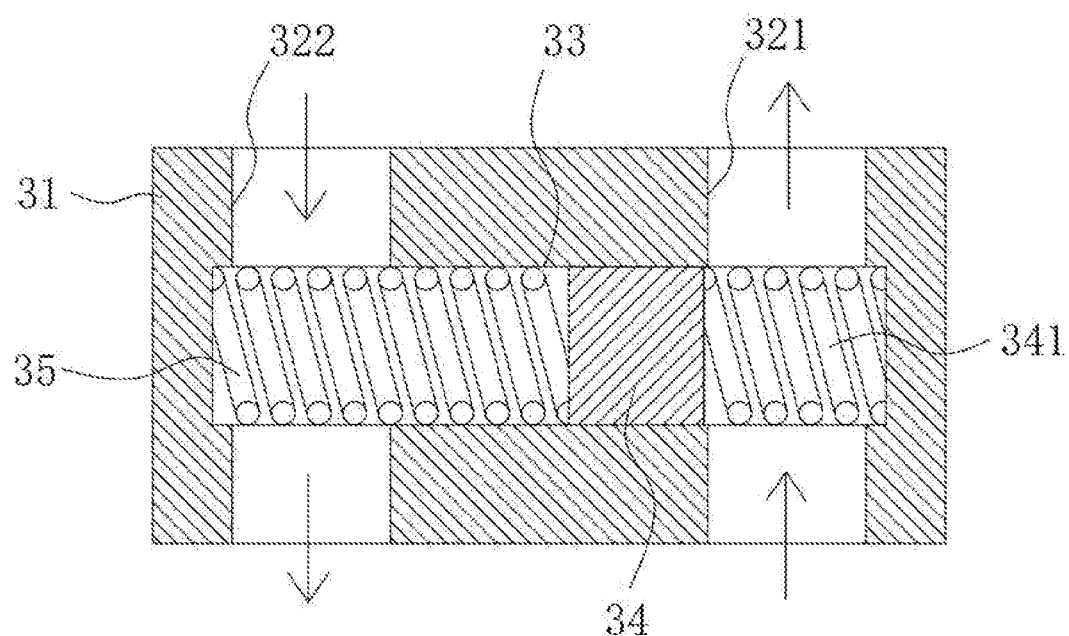
FIG. 2 is a schematic structural diagram I of regulating valves in Embodiment 1.
Figure 3:
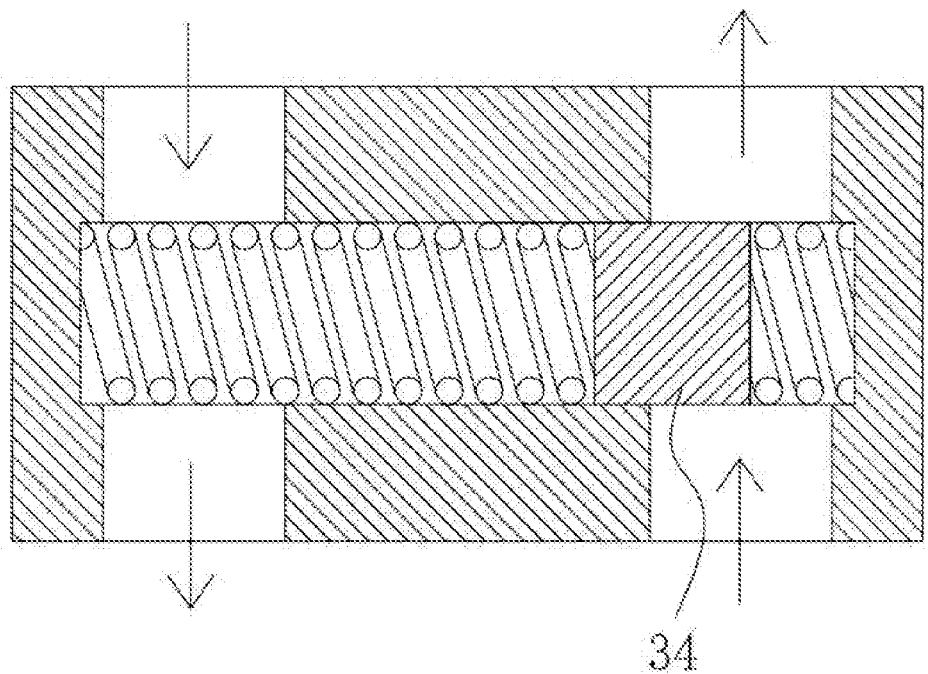
FIG. 3 is a schematic structural diagram II of regulating valves in Embodiment 1.
Figure 4:
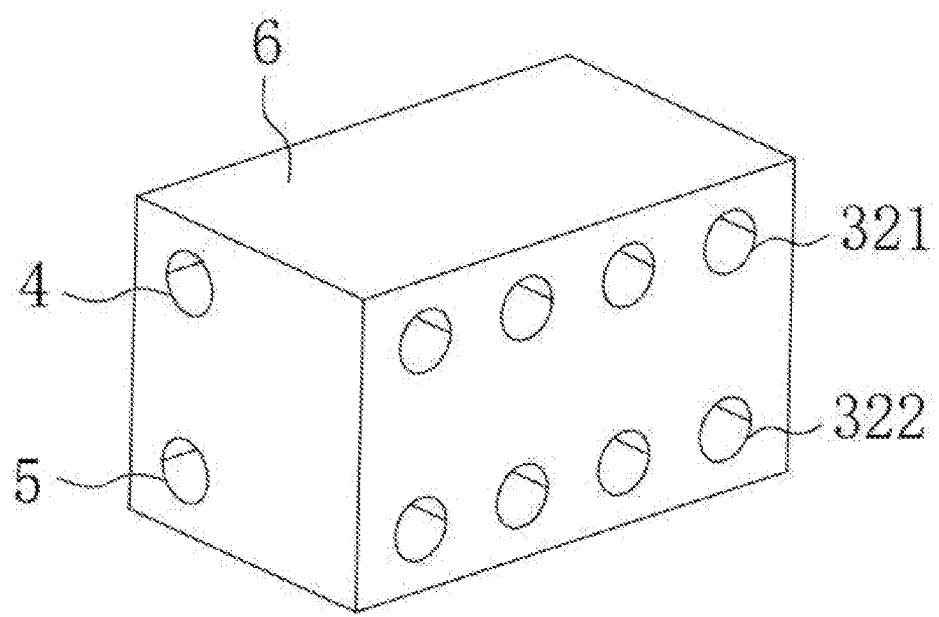
FIG. 4 is a schematic structural diagram of a main regulating valve in Embodiment 1.

Embodiment 1 an adaptive cooling allocation system for multiple motors, as shown in FIGS. 1 to 3, comprises a plurality of cooling groups, a main liquid inlet channel 4 and a main liquid outlet channel 5, wherein each cooling group comprises a motor 1 and a regulating valve 3, a cooling channel 11 is arranged in the motor 1, and a liquid inlet channel 321 and a liquid outlet channel 322 are arranged in the regulating valve 3, respectively, and an outlet end of the liquid inlet channel 321 communicates with an inlet end of the cooling channel 11; specifically, a motor liquid inlet channel 21 is connected therebetween; an outlet end of the cooling channel 11 communicates with an inlet end of the liquid outlet channel 322; specifically, a motor liquid outlet channel 22 is connected therebetween; an inlet end of the liquid inlet channel 321 communicates with the main liquid inlet channel 4, and an outlet end of the liquid outlet channel 322 communicates with the main liquid outlet channel 5; specifically, the system in the embodiment comprises four cooling groups, wherein each cooling group comprises a motor 1 and a regulating valve 3; certainly, the number of the cooling groups can be adjusted as needed, without limitation here; then, the inlet ends of the four liquid inlet channels 321 communicate with the main liquid inlet channel 4, respectively, and the outlet ends of the four liquid outlet channels 322 communicate with the main liquid outlet channel 5, respectively, wherein a regulating channel 33 is also arranged in the regulating valve 3; a valve block 34 is arranged in the regulating channel 33, and extends into the liquid inlet channel 321, so that a regulating hole is formed between the valve block 34 and the liquid inlet channel 321; a temperature control regulating mechanism for controlling the movement of the valve block 34 according to the temperature of the cooling mediums in the liquid outlet channel 322 is also arranged in the regulating channel 33, thereby performing differential cooling allocation on the plurality of cooling groups; specifically, in the embodiment, the temperature control regulating mechanism controls the movement of the valve block 34 according to the temperature of the cooling medium in the liquid outlet channel 322, thereby changing the opening of the regulating hole; specifically, the temperature of the cooling medium in the liquid outlet channel 322 is directly proportional to the opening of the regulating hole; if the temperature of the cooling medium in the liquid outlet channel is relatively high, the opening of the regulating hole is larger; if the temperature of the cooling medium in the liquid outlet channel is relatively low, the opening of the regulating hole is smaller; and if the flow rate of the cooling medium in the main liquid inlet channel 4 is unchanged, the flow rate of the cooling medium allocated to the liquid inlet channel 321 with the smaller-opening regulating hole will be lower than the flow rate of the cooling medium allocated to the liquid inlet channel 321 with the larger-opening regulating hole, thereby achieving differential allocation of the cooling capacity of the system, reducing waste of the cooling capacity and improving the overall cooling effects.

Referring to FIGS. 1 to 3, specifically, in the embodiment, the cooling medium is allocated from the main liquid inlet channel 4 to the four liquid inlet channels 321, and the flow rate of the cooling medium allocated to the liquid inlet channel 321 is controlled by the temperature of the cooling medium in the liquid outlet channel 322. Therefore, if the working conditions of the multiple motors 1 are the same, the flow rate of the cooling medium allocated to the liquid inlet channel 321 is also the same, the cooling medium is evenly allocated to the four liquid inlet channels 321, that is, the same cooling capacity is allocated to each motor; if one of the motors 1 is non-working, the opening of the regulating hole in the corresponding liquid inlet channel is relatively small, and the flow rate of the cooling medium allocated to the liquid inlet channel is relatively low, that is, the cooling capacity allocated to the non-working motor will be lower than that allocated to the working motor; when the total cooling capacity of the system is fixed, differential allocation is adopted to allocate cooling capacity to the working motors as much as possible, thereby reducing waste of the cooling capacity and improving the overall cooling effects; and in the embodiment, the allocation of the cooling capacity of the system is automatically regulated according to temperature, without need for additional control, thereby simplifying the structure and control, reducing costs, and prolonging service life.

Referring to FIGS. 1 to 3, preferably, in an initial state, the regulating hole is in the minimum opening state, and at this time, the cooling medium can pass through the regulating hole; after the cooling medium flows, according to the temperature of the cooling medium in the liquid outlet channel 322, the position of the valve block 34 remains unchanged to maintain the regulating hole to be in the minimum opening state, or the temperature control regulating mechanism controls the movement of the valve block 34 to increase the opening of the regulating hole; for example, for the non-working motor, if the temperature of the cooling medium in the corresponding liquid outlet channel 322 is low, the corresponding regulating hole is remained to be in the minimum opening state; for the working motor, if the temperature of the cooling medium in the corresponding liquid outlet channel is high, the opening of the regulating hole is increased; the cooling mediums are allocated from the main liquid inlet channel 4 to the four liquid inlet channels 321, and the openings of the regulating holes in the liquid inlet channels 321 are different, resulting in different flow rates of the allocated cooling mediums, so that for the working motors, more cooling capacity can be allocated, the waste of the cooling capacity can be reduced and the overall cooling effects can be improved; in the embodiment, the regulating manner of the regulating holes is from small to large, which can simplify the structure of the temperature control regulating mechanisms and facilitate production and processing; and certainly, in other optional embodiments, the regulating holes can also be set in the maximum opening state in the initial state, with regulating methods ranging from large to small, and even the regulating holes can be closed, without limitation here.

Referring to FIGS. 1 to 3, preferably, the temperature control regulating mechanism comprises a temperature control driving component which can be deformed according to temperature changes and uses driving force generated by deformation to control the movement of the valve block 34; the temperature control driving components are adopted, the advantages of being fewer in parts, simple in structure, convenient in production, stable in control, and long in service life are achieved; besides, control circuits are not needed and various harsh working conditions can be adapted; and the temperature control driving component comprises a temperature control spring, a temperature control airbag, or a temperature control chamber formed in the regulating channel. Certainly, in other optional embodiments, the temperature control regulating mechanisms can also adopt a manner that a temperature sensor cooperates with an electromagnetic valve, etc. to realize regulation, without limitation here.

Referring to FIGS. 1 to 3, specifically, the temperature control driving component in the embodiment is the temperature control spring 35 which can be in contact with the cooling medium in the liquid outlet channel 322; the temperature control spring 35 extends at low temperature and contracts at high temperature; and the temperature control regulating mechanism also comprises a pre-tightening spring 341, wherein the pre-tightening spring 341 and the temperature control spring 35 act on two sides of the valve block 34, respectively, that is, the action force direction of the temperature control spring 35 is opposite to that of the first pre-tightening spring 341. That is, the temperature control spring 35 in the embodiment can use a memory spring which is a temperature sensing driving element that can self extend or contract with temperature changes, and after the temperature control spring is in contact with a heat source to reach its extending and contracting temperature, deformation occurs; therefore, the temperature control spring 35 extends at low temperature and contracts at high temperature; the low and high temperature here is relative to the extending and contracting temperature of the memory spring, with temperature lower than the extending and contracting temperature being low, and temperature greater than or equal to the extending and contracting temperature being high; the extending and contracting temperature of the temperature control spring 35 is selected and matched according to the temperature of the cooling medium in the liquid outlet channel, for example, the extending and contracting temperature is higher than the temperature of the cooling medium in the liquid outlet channel of the non-working motor, but lower than the temperature of the cooling medium in the liquid outlet channel of the working motor; and after the cooling medium in the liquid outlet channel of the working motor is in contact with the temperature control spring 35, the temperature control spring 35 contracts, and the valve block 34 moves under the elastic force of the first pre-tightening spring 341 to increase the opening of the regulating hole. However, after the cooling medium in the liquid outlet channel of the non-working motor is in contact with the temperature control spring 35, the temperature control spring 35 will not be deformed, and the regulating hole will be remained in the minimum opening state.

Referring to FIGS. 1 to 3, in the embodiment, the memory spring which contracts at high temperature is adopted as the temperature control driving component, the extending and contracting length of the memory spring remains unchanged, so that the regulating hole has two opening states: one is the minimum opening state corresponding to the non-working motor, and the other is the maximum opening state corresponding to the working motor; and preferably, in the maximum opening state, the end surface of the valve block 34 is concave or flush with inner wall of the liquid inlet channel 321. In the embodiment, the regulating hole only has two opening states, so that the automatic regulation of the system can be simplified, the execution action and difficulty of the valve blocks in the regulation process can be reduced, and the system is simple in structure, low in production cost and long in service life. Certainly, in other optional embodiments, the opening state of the regulating holes can also be increased as needed to achieve more accurate allocation, without limitation here. For example, a plurality of concentrically nested memory springs are used to form a temperature control spring group, and the extending and contracting temperatures of the memory springs are different.

Referring to FIGS. 1 to 3, preferably, in the embodiment, one end of the temperature control spring 35 is in contact with an inner wall of the liquid outlet channel 322, and the other end is in contact with the valve block 34; one end of the first pre-tightening spring 341 is in contact with the inner wall of the liquid inlet channel 321, and the other end is in contact with the valve block 34; specifically, in the embodiment, the regulating channel 33 vertically communicates between the liquid inlet channel 321 and the liquid outlet channel 322; and at this time, the temperature control spring 35 penetrates through the liquid outlet channel 322 radially along the liquid outlet channel 322, so that the cooling medium in the liquid outlet channel 322 can be in direct contact with the temperature control spring 35 when flowing. Certainly, in other optional embodiments, steps or fixing rings can also be arranged on the inner wall of the regulating channel 33 to make the cooling mediums be in contact with the end of the temperature control spring 35, without limitation here. Certainly, in other optional embodiments, the regulating channel 33 can also adopt the manner that one end communicates with the liquid inlet channel 321, and the other end is closed, so that the end of the temperature control spring 35 is in contact with the inner end surface of the regulating channel 33, and then an extending channel communicating with the liquid outlet channel 322 and the regulating channel 33, respectively, is arranged in the regulating valve to make the cooling medium be in contact with the temperature control spring 35, without limitation here. Preferably, a sink groove that cooperates with the first pre-tightening spring 341 is formed in the inner wall of the liquid inlet channel 321, thereby ensuring the stability of the first pre-tightening springs 341 and simplifying the structure for convenient assembly; and a sink groove that cooperates with the temperature control spring 35 is formed in the inner wall of the liquid outlet channel 322, thereby ensuring the stability of the temperature control spring 35 and simplifying the structure for convenient assembly. In the embodiment, the first pre-tightening spring 341 is used to cooperate with the temperature control spring 35 to control the movement of the valve block 34, that is, when the temperature control spring 35 contracts, the first pre-tightening spring 341 drives the movement of the valve block 34, and when the temperature control spring 35 extends, the valve block 34 is driven to move, and the first pre-tightening spring 341 is compressed; and when the temperature control spring 35 cooperates with the first pre-tightening spring 341, two ends of the temperature control spring 35 are in the contact state, which is conducive to maintaining the extending and contracting performance, improving the stability and movement timeliness of the valve block 34 for convenient assembly. Certainly, in other optional embodiments, the temperature control spring 35 can also be connected with the valve block 34 and then drive the valve block 34 to move, without limitation here. In the embodiment, the temperature control regulating mechanism comprises the temperature control spring 35 and the first pre-tightening spring 341, which has the advantages of being fewer in parts, convenient in production and processing, low in production cost, good in stability, and long in service life.

Referring to FIGS. 1 to 4, preferably, a plurality of regulating valves 3 are integrated into the main regulating valve 6, the main liquid inlet channel 4 and the main liquid outlet channel 5 are arranged in the main regulating valve 6, respectively; the regulating valve 3 comprises a valve body 31, and the plurality of regulating valves 3 are integrated, that is, the plurality of valve bodies 31 are integrally formed; the main regulating valve 6 is used, so that the number of parts is reduced, and mounting and layout are facilitated; during operation, the main liquid inlet channel 4 is connected with a liquid inlet pipe of a cooling medium circulation system, and the main liquid outlet channel 5 is connected with a liquid outlet pipe of the cooling medium circulation system; and in other optional embodiments, the main liquid inlet channel 4 or the main liquid outlet channel 5 can also exist in the form of a chamber, without limitation here.

Embodiment 2 an adaptive cooling allocation system for multiple motors, referring to FIGS. 1 to 5, is based on Embodiment 1. The difference between Embodiment 2 and Embodiment 1 lies in that the temperature control regulating mechanism in the regulating valve in Embodiment 2 is different from that in Embodiment 1. Specifically, the temperature control regulating mechanism comprises a driving block 361, and a driving rod 362 is arranged between the driving block 361 and the valve block 34, that is, the driving block 361 drives the valve block 34 to move through the driving rod 362. In the embodiment, the temperature control springs 35 contract at low temperature and extend at high temperature. The temperature control spring 35 acts on the driving block 361, and the driving rod 362 penetrates through the temperature control spring 35. The temperature control regulating mechanism also comprises pre-tightening springs of which action force directions are opposite to those of the temperature control springs 35, and the pre-tightening springs act on the valve block 34 or the driving block 361; preferably, the temperature control regulating mechanism comprises two pre-tightening springs of which action force directions are opposite, the two pre-tightening springs act on the valve block 34 and the driving block 361, respectively, or the two pre-tightening springs act on the two sides of the valve block 34, respectively; and the two pre-tightening springs are adopted, so that improving the stability of the driving blocks 361 and the valve blocks 34 is facilitated. In the embodiment, the temperature control spring 35 can be a memory spring or a thermosensitive spring, preferably the memory spring; when the temperature control spring 35 extends at high temperature, the driving block 361 is driven to move; the driving block 361 then drives the valve block 34 to move through the driving rod 362; when the temperature control springs 35 contract at low temperature, the pre-tightening springs release elastic force to reset the driving blocks 361 and the valve blocks 34; and if the memory spring is used, the regulating hole in the embodiment also has two opening states, namely the minimum opening state and the maximum opening state.

Figure 5:
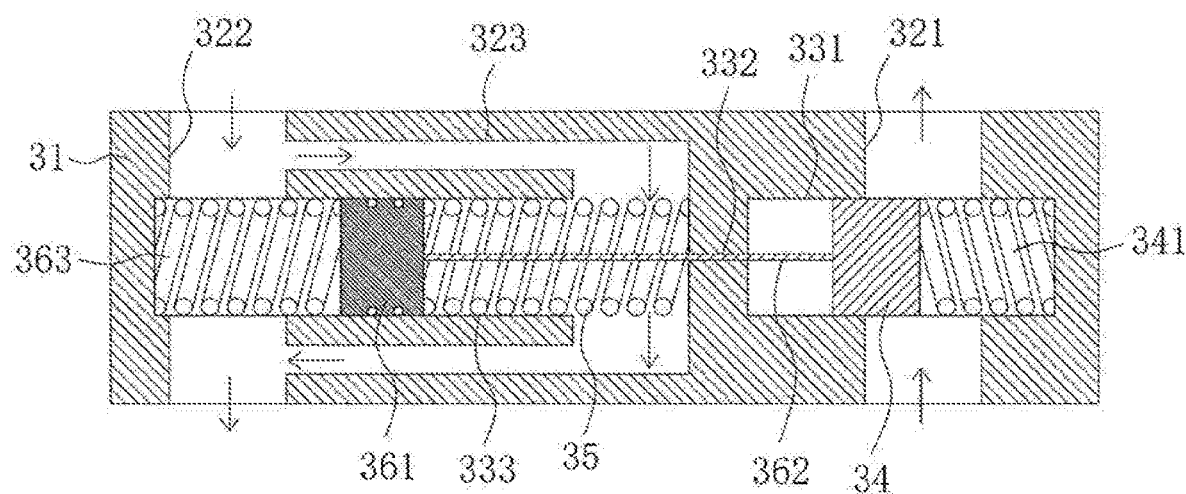
FIG. 5 is a schematic structural diagram of regulating valves in Embodiment 2.
Figure 6:
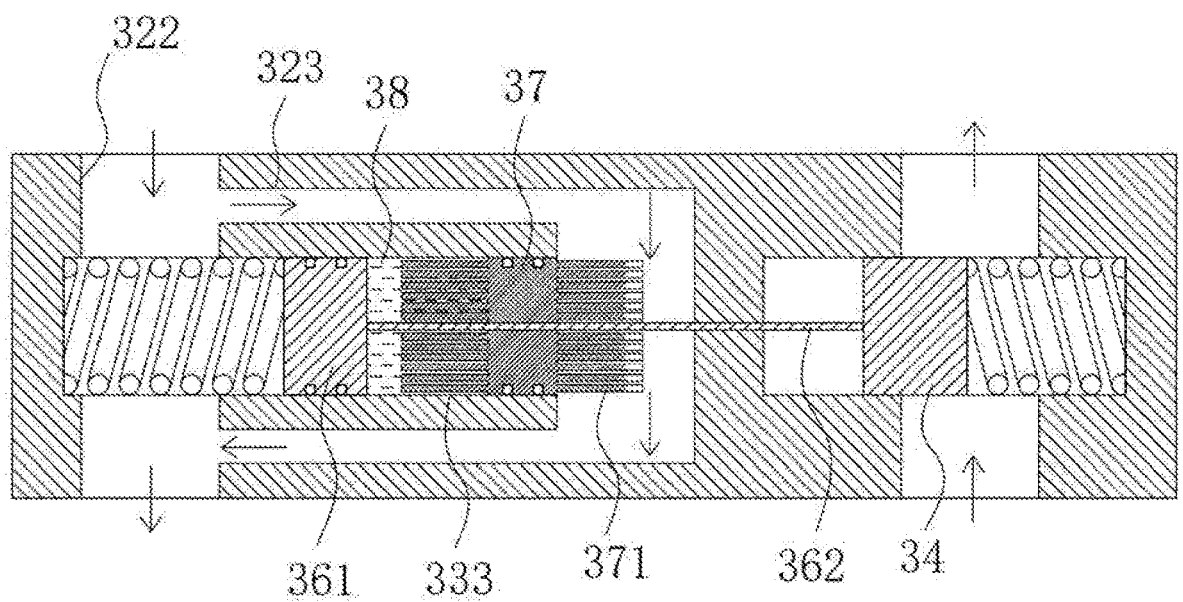
FIG. 6 is a schematic structural diagram of regulating valves in Embodiment 3.
Figure 7:
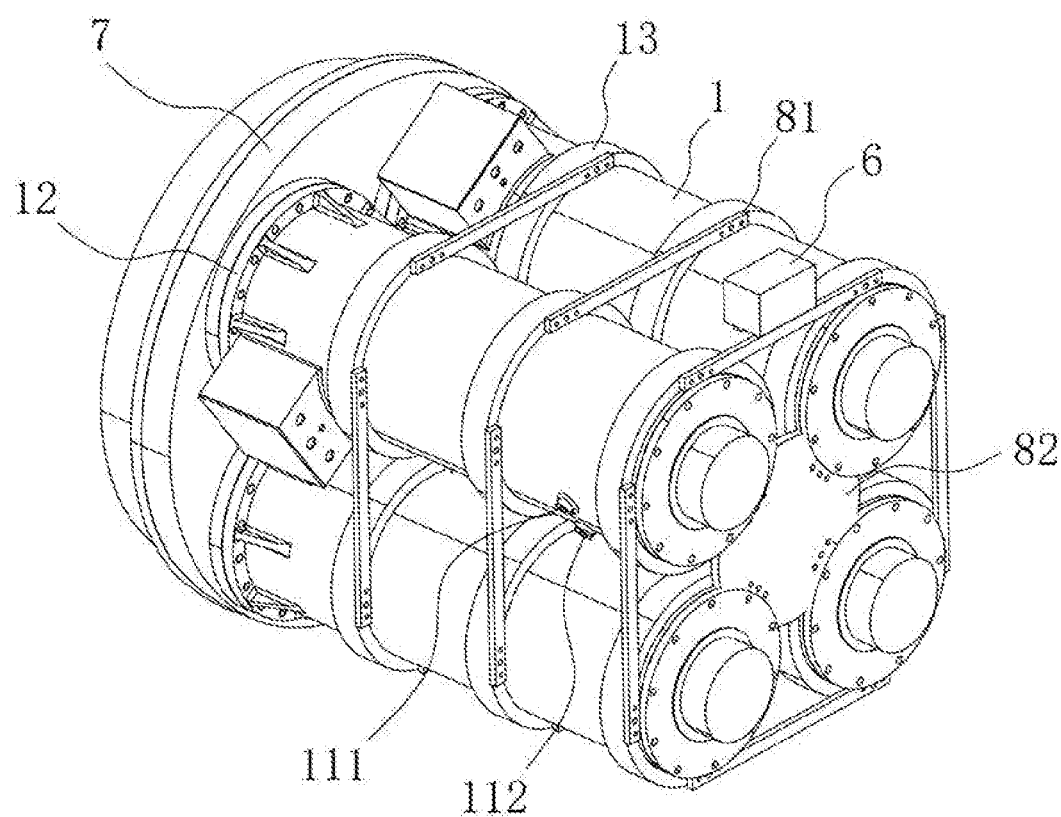
FIG. 7 is a schematic structural diagram of a junction motor assembly in Embodiment 4.

Referring to FIG. 5, preferably, each regulating channel comprises a first channel 331, a second channel 332, and a third channel 333 that are in sequential communication, wherein the valve block 34 is arranged in the first channel 331, the driving block 361 is arranged in the third channel 333, the driving rod 362 penetrates through the second channel 332, and the inner diameter of the second channel 332 is smaller than that of the third channel 333; one end of the temperature control spring 35 is in contact with the driving block 361, and the other end is in contact with the inner wall of the third channel 333; the two pre-tightening springs in the temperature control regulating mechanism are the first pre-tightening spring 341 and the second pre-tightening spring 363, respectively, wherein one end of the first pre-tightening spring 341 is in contact with the valve block 34, and the other end is in contact with the inner wall of the liquid inlet channel 321; one end of the second pre-tightening spring 363 is in contact with the driving block 361, and the other end is in contact with the inner wall of the liquid outlet channel 322; preferably, a liquid outlet diversion channel 323 is arranged in the regulating valve, and an inlet and an outlet of the liquid outlet diversion channel 323 are located on the inner wall of the liquid outlet channel 322, respectively; the cooling mediums in the liquid outlet channels 322 pass through the liquid outlet diversion channels 323 and transfer heat to the temperature control driving components in the liquid outlet diversion channels 323; specifically, if the liquid outlet diversion channel 323 communicates with the third channel 333, the cooling mediums can be in direct contact with the temperature control springs 35; and certainly, in other optional embodiments, the liquid outlet diversion channels 323 can also be canceled, and the regulating channels can be extended, so that the temperature control springs 35 cross the liquid outlet channels 322, without limitation here.

Embodiment 3 an adaptive cooling allocation system for multiple motors, referring to FIGS. 1 to 6, is based on Embodiment 2, the difference between Embodiment 3 and Embodiment 1 lies in that in the embodiment, the temperature control driving component is a temperature control chamber 38 formed in the regulating channel; specifically, a heat conduction block 37 which can be in contact with the cooling medium in the liquid outlet channel is fixedly arranged in each third channel 333; the driving rod 362 penetrates through the heat conduction block 37, and a temperature control chamber 38 which expands when heated and contracts when cooled is formed among the driving block 361, the heat conduction block 37, and the inner wall of the third channel 333; and the cooling medium in the liquid outlet channel 322 passes through the liquid outlet diversion channel 323, is in contact with the heat conduction block 37 and transfers heat in the liquid outlet diversion channel 323, and the heat conduction block 37 transfers the heat to the medium in the temperature control chamber 38, such as air, causing the temperature control chamber 38 to expand; the heat conduction block 37 is fixed, and the expanded temperature control chamber 38 pushes the driving block 361 to move, thereby driving the valve block 34 to move. Preferably, a plurality of heat conduction rods 371 are arranged on the two sides of the heat conduction block 37, respectively, thereby enlarging the heat conduction area and improving the heat conduction effects. Certainly, in other optional embodiments, the temperature control chamber 38 can also be replaced with a thermosensitive airbag, without limitation here. Compared to the memory springs in Embodiment 1 and Embodiment 2, in the embodiment, the temperature control chamber 38 can be used to incrementally regulate the opening of the regulating holes, that is, the regulating holes can form various different opening states.

Embodiment 4 a junction motor assembly, referring to FIGS. 1 to 7, comprises a gearbox 7, multiple motors 1 connected with the gearbox 7, respectively, and an adaptive cooling allocation system for multiple motors in Embodiment 1, 2 or 3, and specifically comprises a main regulating valve 6; specifically, four motors 1 are connected to the gearbox 7 in the Embodiment, and certainly, the number of the motors 1 can be adjusted as needed, without limitation here. The motor 1 in the embodiment comprises a motor casing, the cooling channel 11 is arranged in the motor casing, a cooling channel inlet 111 and a cooling channel outlet 112 are formed in the motor casing, respectively, and are in pipeline connection with the main regulating valve 6. Preferably, the cooling medium in the embodiment adopts water, namely, a water cooling manner is adopted for cooling the motors 1, so that the cooling effects can be improved. Preferably, the junction motor assembly in the embodiment also comprises a fixing plate 82 which is connected with the multiple motors 1, and a fixing rod 81 is connected between the adjacent motors 1; specifically, a fixing ring 13 for being connected with the fixing rod 81 or the fixing plate 82 is arranged on the outer side wall of the motor casing; and the fixing rod 81 and the fixing ring 13, as well as the fixing plate 82 and the fixing rings 13, are fixedly connected through bolts, thereby improving the overall stability. The motor 1 also comprises a fixing flange 12, and is connected with the gearbox 7 through the fixing flange 12. During transportation, the motor 1 and the gearbox 7 are in a separate state, and the fixing rods 81 and the fixing plate 82 are also separated from the motors 1, thereby facilitating manufacturing and transportation; after the motors 1 and the gearbox 7 are assembled, the fixing rods 81 and the fixing plate 82 are mounted, so that overall stability can be improved. In the embodiment, the motors 1 can be used as driving motors or as generators, without limitation here. If the junction motor assembly in the embodiment is used as a wind driven generator and is installed at a high altitude, with poor working environment and inconvenient maintenance, then the junction motor assembly adopts the adaptive cooling allocation system in Embodiment 1, 2, or 3, using temperature control driving components to achieve allocation regulation, without the need for additional control circuits, which is not only convenient for mounting, low in production cost, and does not require maintenance, but also has a long service life; besides, after long-time use, the temperature control driving components have failed, and even if the failed temperature control driving components are not replaced, the cooling of the system cannot be influenced, only the allocation function is lost; and certainly, the arrangement of the main regulating valve 6 also facilitates replacement during maintenance.

What is claimed is:

1. An adaptive cooling allocation system for multiple motors, comprising:
a plurality of cooling groups, wherein each cooling group comprises a motor and a regulating valve, a cooling channel is arranged in the motor, and a liquid inlet channel and a liquid outlet channel are arranged in the regulating valve, respectively; an outlet end of the liquid inlet channel communicates with an inlet end of the cooling channel, and an outlet end of the cooling channel communicates with an inlet end of the liquid outlet channel; and
a main liquid inlet channel, wherein inlet ends of the plurality of liquid inlet channels communicate with the main liquid inlet channel, respectively;
a regulating channel is also arranged in the regulating valve; a valve block is arranged in the regulating channel, and extends into the liquid inlet channel, so that a regulating hole is formed between the valve block and the liquid inlet channel;
a temperature control regulating mechanism for controlling movement of the valve block based on temperature of a cooling medium in the liquid outlet channel is also arranged in the regulating channel, thereby performing differential cooling allocation on the plurality of cooling groups;
in an initial state, the regulating hole is in a minimum opening state; after the cooling medium flows, a position of the valve block remains unchanged according to the temperature of the cooling medium in the liquid outlet channel to maintain the minimum opening state of the regulating hole, or the temperature control regulating mechanism controls the movement of the valve block to increase opening of the regulating hole; and
the temperature control regulating mechanism comprises a temperature control driving component which can be deformed according to temperature changes and uses driving force generated by deformation to control the movement of the valve block.

2. The adaptive cooling allocation system for multiple motors according to claim 1, wherein the temperature control driving component is a temperature control spring which can be in contact with the cooling medium in the liquid outlet channel; the temperature control spring extends at low temperature and contracts at high temperature; and
the temperature control regulating mechanism also comprises a pre-tightening spring, and the pre-tightening spring and the temperature control spring act on two sides of the valve block, respectively.

3. The adaptive cooling allocation system for multiple motors according to claim 2, wherein one end of the temperature control spring is in contact with an inner wall of the liquid outlet channel, and the other end is in contact with the valve block; and one end of the pre-tightening spring is in contact with an inner wall of the liquid inlet channel, and the other end is in contact with the valve block.

4. The adaptive cooling allocation system for multiple motors according to claim 1, wherein the temperature control regulating mechanism comprises a driving block, and a driving rod is arranged between the driving block and the valve block;

the temperature control driving component is a temperature control spring which can be in contact with the cooling medium in the liquid outlet channel; the temperature control spring contracts at low temperature and extends at high temperature; the temperature control spring acts on the driving block, and the driving rod penetrates through the temperature control spring; and the temperature control regulating mechanism comprises two pre-tightening springs of which action force directions are opposite, the two pre-tightening springs act on the valve block and the driving block, respectively, or the two pre-tightening springs act on the two sides of the valve block, respectively.

5. The adaptive cooling allocation system for multiple motors according to claim 1, wherein the temperature control regulating mechanism comprises a driving block, and a driving rod is arranged between the driving block and the valve block;

a heat conduction block which can be in contact with the cooling medium in the liquid outlet channel is fixedly arranged in the regulating channel; the driving rod penetrates through the heat conduction block, and a temperature control chamber which expands when heated and contracts when cooled is formed among the driving block, the heat conduction block, and an inner wall of the regulating channel; and the temperature control regulating mechanism comprises two pre-tightening springs of which action force directions are opposite, the two pre-tightening springs act on the valve block and the driving block, respectively, or the two pre-tightening springs act on the two sides of the valve block, respectively.

6. The adaptive cooling allocation system for multiple motors according to claim 1, wherein a liquid outlet diversion channel is arranged in the regulating valve, and an inlet and an outlet of the liquid outlet diversion channel are located on an inner wall of the liquid outlet channel, respectively; and the cooling medium in the liquid outlet channel passes through the liquid outlet diversion channel and transfers heat to the temperature control driving component in the liquid outlet diversion channel.

7. The adaptive cooling allocation system for multiple motors according to claim 1, wherein the plurality of regulating valves are integrated into a main regulating valve, and the main liquid inlet channel is arranged in the main regulating valve; and a main liquid outlet channel is arranged in the main regulating valve, and an outlet end of the liquid outlet channel communicates with the main liquid outlet channel.

8. A junction motor assembly, comprising a gearbox and multiple motors connected with the gearbox, further comprising: the adaptive cooling allocation system for multiple motors according to claim 1, and a fixing plate connected to the multiple motors at the same time, wherein a fixing rod is connected between adjacent motors; and the motor comprises a motor casing, and a fixing ring for connecting with the fixing rod or the fixing plate is arranged on an outer side wall of the motor casing.

* * * * *